(12) United States Patent
Sabeti et al.

(10) Patent No.: US 10,197,122 B2
(45) Date of Patent: Feb. 5, 2019

(54) BRAKE DISC WITH CONING-COMPENSATING ARRANGEMENT

(71) Applicant: Bendix Spicer Foundation Brake LLC, Elyria, OH (US)

(72) Inventors: Manouchehr Sabeti, North Olmstead, OH (US); James Seaman, Avon, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 91 days.

(21) Appl. No.: 15/093,278

(22) Filed: Apr. 7, 2016

(65) Prior Publication Data

US 2017/0292575 A1 Oct. 12, 2017

(51) Int. Cl.
*F16D 65/12* (2006.01)
*F16D 65/02* (2006.01)

(52) U.S. Cl.
CPC .......... *F16D 65/128* (2013.01); *F16D 65/12* (2013.01); *F16D 2065/132* (2013.01); *F16D 2065/1328* (2013.01)

(58) Field of Classification Search
CPC ............... F16D 65/123; F16D 65/128; F16D 2065/1328
USPC .................................................. 188/218 XL
See application file for complete search history.

(56) References Cited

U.S. PATENT DOCUMENTS 2,255,023 A * 9/1941 Eksergian ............. F16D 65/123
188/218 XL
4,651,851 A 3/1987 Latvala et al.
4,930,606 A * 6/1990 Sporzynski ........... F16D 65/123
188/218 XL
6,116,387 A 9/2000 Kao et al.
6,119,820 A 9/2000 Steptoe et al.
(Continued)

FOREIGN PATENT DOCUMENTS

EP  1 396 654 A2  3/2004
GB  1 276 609 A   6/1972

OTHER PUBLICATIONS

International Search Report (PCT/IB/220 & PCT/IB/210) issued in PCT Application No. PCT/US2017/025878, including Written Opinion (PCT/ISA/237) dated Jun. 22, 2017 (nine (9) pages).
(Continued)

*Primary Examiner* — Bradley T King
(74) *Attorney, Agent, or Firm* — Crowell & Moring LLP

(57) ABSTRACT

An internally ventilated brake disc with a disc coning reducing arrangement is provided in which temperature differences between inboard and outboard sides of the brake disc are minimized in order to reduce coning-causing differential thermal expansion. Between a radially inner region of a brake disc that includes brake disc-to-axle hub mounting features and a radially outer region the mass of the inboard side of the brake disc is distributed in a manner that reduces the amount of differential thermal expansion occurring during brake application between the inboard and outboard sides of the brake disc, thereby minimizing thermally-induced coning effects. The inboard side disc plate portion may having an increasing axial thickness in the direction from the radially outer region to the radially inner region, providing additional material mass to receive and dissipate heat energy received during a braking event.

17 Claims, 9 Drawing Sheets

(56) References Cited

U.S. PATENT DOCUMENTS

| | | | | |
|---|---|---|---|---|
| 6,142,267 A | * | 11/2000 | Sporzynski | F16D 65/12 |
| | | | | 188/218 XL |
| 6,241,053 B1 | * | 6/2001 | Tahara | F16D 65/12 |
| | | | | 188/218 XL |
| 6,405,839 B1 | * | 6/2002 | Ballinger | F16D 65/0006 |
| | | | | 188/218 XL |
| 6,626,273 B1 | | 9/2003 | Baumgartner et al. | |
| 7,410,036 B2 | | 8/2008 | Wimmer et al. | |
| 2006/0243546 A1 | * | 11/2006 | Oberti | F16D 65/123 |
| | | | | 188/218 XL |
| 2011/0259683 A1 | * | 10/2011 | Hester | B60T 8/329 |
| | | | | 188/218 XL |

OTHER PUBLICATIONS

International Preliminary Report on Patentability (PCT/IB/373) issued in PCT Application No. PCT/US2017/02578 dated Oct. 9, 2018, including Written Opinion (PCT/ISA/237) issued in PCT Application No. PCT/US2017/02578 dated Jun. 22, 2017 (seven (7) pages).

* cited by examiner 159.3 - 153.3
153.3 - 141.2
141.2 - 104.9
104.9 - 68.7
[C]

BRAKE DISC WITH CONING-COMPENSATING ARRANGEMENT

BACKGROUND AND SUMMARY OF THE INVENTION

The present invention relates to disc brakes for vehicles, and in particular to a brake disc of the disc brake arranged to reduce disc coning.

Disc brakes are increasing being used on commercial vehicles, replacing conventional drum brakes. Commercial vehicle brake discs (also referred to as "discs") often are mounted onto axle hubs using so-called spline arrangements using a fixed or floating connection, such as taught in U.S. Pat. Nos. 6,626,273 and 7,410,036. One example a semi-floating connection is the Splined Disc® brake assembly from Bendix Spicer Foundation Brake LLC. These types of brakes typically are mounted on an axle hub having a plurality of axially-oriented splines arranged around an outer circumference of a disc-mounting region of the hub. The brake disc has corresponding radially-inward facing tabs about the inner circumference of the brake disc. The disc is mounted to the axle hub by axially sliding the brake disc onto the hub's mating splines, followed by insertion and/or attachment of a variety of fasteners, brackets, etc., as necessary per the particular splined disc's design in order to secure the brake disc against axial movement off of the hub. Alternatively, the brake disc may have a flange member extending laterally from the inner radial region at the generally parallel friction rings of the disc, an example of which may be seen in U.S. Pat. No. 4,651,851.

Very high braking energy is generated when the disc brake's caliper applies the brake pads to the brake disc to slow such heavy vehicles. During braking, the vehicle's kinetic energy is converted to heat energy, resulting in high temperatures in the brake disc.

The braking-generated heat is absorbed by and dissipated from the disc, by conduction and radiation to other portions of the brake disc and adjacent components and/or by convection via cooling air. Typically, the heat is not distributed evenly over the brake disc due to many heat transfer factors, such as natural and forced convection, radiation, lack of homogeneity in the brake disc material, and different rates of heat generation at the inner radius of the disc and the outer radius of the disc. Further, in internally-ventilated brake discs (i.e., discs having an inboard friction portion and an outboard friction portion with ventilation channels therebetween), often the configuration of the adjacent wheel and axle structure will cause uneven heat dissipation from the inboard and outboard sides, contributing to further increases in the temperature gradient between the inboard and outboard sides of the disc.

Due to gradients in temperature distribution, different regions of the disc will exhibit different amounts of thermal expansion. Where there is a temperature gradient between the inboard and outboard side plates of the disc, the resulting difference in thermal expansion will cause one side to expand more than the other side. This differential expansion manifests itself in the form "coning" of the disc, a condition in which the disc at its outer radius is axially displaced relative to the inner radius of the disc. This is an undesired phenomena, as coned discs are more susceptible to thermal juddering and heat cracking.

Coning is generally not directly addressed in most ventilated brake discs, which have friction plates that are parallel-sided, constant thickness disc plates, with constant-width air cooling channels between them. An example of a rare attempt to address coning may be seen in U.S. Pat. No. 6,116,387, which teaches an approach that varies the thickness of both disc plates simultaneously, i.e., maintaining a generally constant cooling channel width while varying the thickness of one disc plate in concert with the other disc plate. This approach maintains generally the same overall brake disc material thickness in order to placing the thickest portions of each disc plate in the radially-opposite regions where conning distortions are expected to be their worst (e.g., at the radially inner region of one disc plate and at the radially outer region of the other disc plate). Examples of this approach are shown in FIGS. 2-3 of U.S. Pat. No. 6,116,387, where the cooling channels are maintained at a constant thickness as both disc plates vary in thickness at the same rate, and the amount of disc plate material is constant at any given radius. Similarly, FIG. 1 of this document shows both disc plates' inner surface geometries being varied opposite one another such that the total material thickness is essentially constant, the maximum disc plate thickness regions are at radially opposite positions, and the cooling channels are essentially constant in width (with exception of the channels' slight widening at the extreme inner and outer radii of the channels).

In contrast to the prior art's lack of focus on coning resistance (i.e., straight-sided parallel disc plates) or constant material-width approaches as in U.S. Pat. No. 6,116,387, the present invention minimizes coning and solves other problems by achieving a more even temperature distribution between the inboard and outboard disc plates with arrangement of the material of the brake disc inboard and outboard plates and the size and shape of the ventilation channels therebetween in a differential manner, and without the need to provide for radially-inner region disc plate thinning (and consequent manufacturability difficulties).

The inventive arrangements result in volumetric and geometry differences in the material of the disc portions that alter heat reception and dissipation in different disc regions, such that the heat dissipates in a manner that minimizes temperature gradients between the inboard and outboard disc plates. In a preferred embodiment, the geometry of the surfaces of the inboard and outboard plates which face one another may be arranged to provide enhanced cooling air flow by creating a greater "nozzle effect" to draw additional cooling air through the brake disc from its inner radius toward its outer radius.

Where the highest temperatures are present at the outer diameter of the inboard and outboard disc plates (and thus the temperature differences between the two plates are relatively small), it is possible to only alter the volumetric distribution of the disc material in the region of the inner radius of the disc to adequately compensate for disc coning.

The present invention also permits lowering of stress generated by disc coning at the region of the disc's connection to the hub of the vehicle axle by minimizing angular displacement at the root of the disc's hub-interfacing teeth or attachment fasteners.

A further advantage of the present invention is optimized disc material use, potentially permitting reduction in disc mass which can lower material costs and vehicle fuel consumption, for example in cases in which material in the radially-outer region of the brake disc can be reduced due to lower projected temperatures and associated lower wear rates.

In one embodiment a brake disc includes a first side disc plate with radially-inner projections configured to engage corresponding splines on an axle hub, and a second side disc plate without radially-inner projections (for example, a side consisting primarily of a "friction ring" of material engaged by a brake pad). Typically, the first side disc plate is the inboard side of the brake disc, i.e., the side facing away from the wheel, and reaches higher temperatures than the second side facing the wheel due to there being less conductive and radiation-based heat transfer on the inboard side adjacent to the congested region of the axle hub.

In this embodiment, the axial thickness of the first side plate may be greater than that of the second side plate, and further may increase in thickness in the radially-inward direction. In such an arrangement, the internal ventilation channels between the disc plates expand in axial width in the radially-outward direction. This configuration provides a greater cooling air flow cross-section area at the outer radius of the ventilation channels as compared to the area at the inner radius of the channels, creating a "nozzle effect" which enhances the radially-outward cooling air flow and increases disc cooling.

From a temperature difference perspective, the differences in mass and geometry between the two sides of the brake disc result in reduced temperature differences between the two sides and thereby reduced coning of the brake disc. During a braking event the friction between the brake pads and their respective disc friction surfaces deposits approximately the same quantity of heat into both sides of the brake disc. In a conventional brake disc, due to the lesser heat transfer from the inboard side of the disc to its environment as compared to the relatively exposed outboard side, the temperature of the inboard side rises to a higher temperature than the outboard side of the disc.

In the present invention, the greater mass of the first side allows the heat deposited on this side of the disc to be distributed over more material than the second side, and as a result the first side does not reach as high a temperature relative to the second side as in a conventional brake disc. In addition, the increase in cooling air flow in the internal ventilation channels, as well as the greater surface area on the internal face of the disc first side exposed to the increased cooling air flow, further enhances heat dissipation from the first side and thereby further helps reduce the difference in temperature between the inboard and outboard sides of the brake disc. The decrease in temperature difference between the first and second sides of the brake disc directly leads to reduction in differences in the amounts of thermal expansion experienced by the two sides of the brake disc, and thus a reduction in the amount of coning of the disc as the two sides expand more equally.

Other objects, advantages and novel features of the present invention will become apparent from the following detailed description of the invention when considered in conjunction with the accompanying drawings.

DETAILED DESCRIPTION OF THE DRAWINGS

Figure 1:
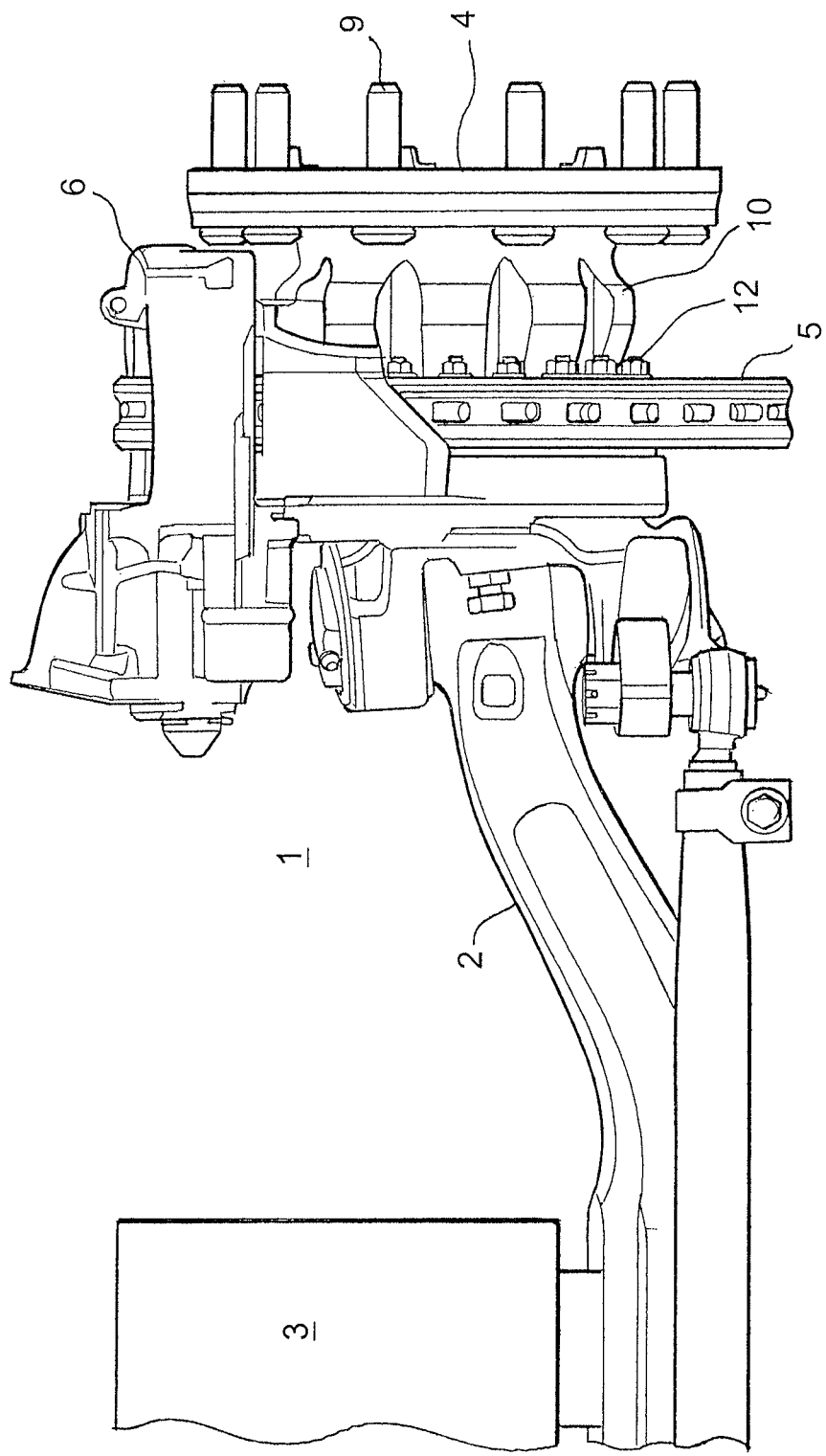
FIG. 1 is a cross-section view of a conventional disc brake.

FIG. 1 illustrates a disc brake 1 of a commercial vehicle. The disk brake 1 is located at an end region of a vehicle axle having a fixed axle portion 2 connected to the vehicle 3. A rotating axle hub 4 with wheel-mounting studs 9, a brake disc 5 connected to the axle hub 4 in a non-rotational manner, and a brake caliper 6 are shown mounted on the fixed axle portion 2 in a manner well known in the art, and thus is not further illustrated. The hub 4 includes a plurality of splines 10 around its circumference which receive radially-inward projections of the brake disc (shown in the following figures), and the brake disc 5 is retained on the hub 4 in a fixed or floating manner by fasteners 12 in a manner well-known in the art.

Figure 2:
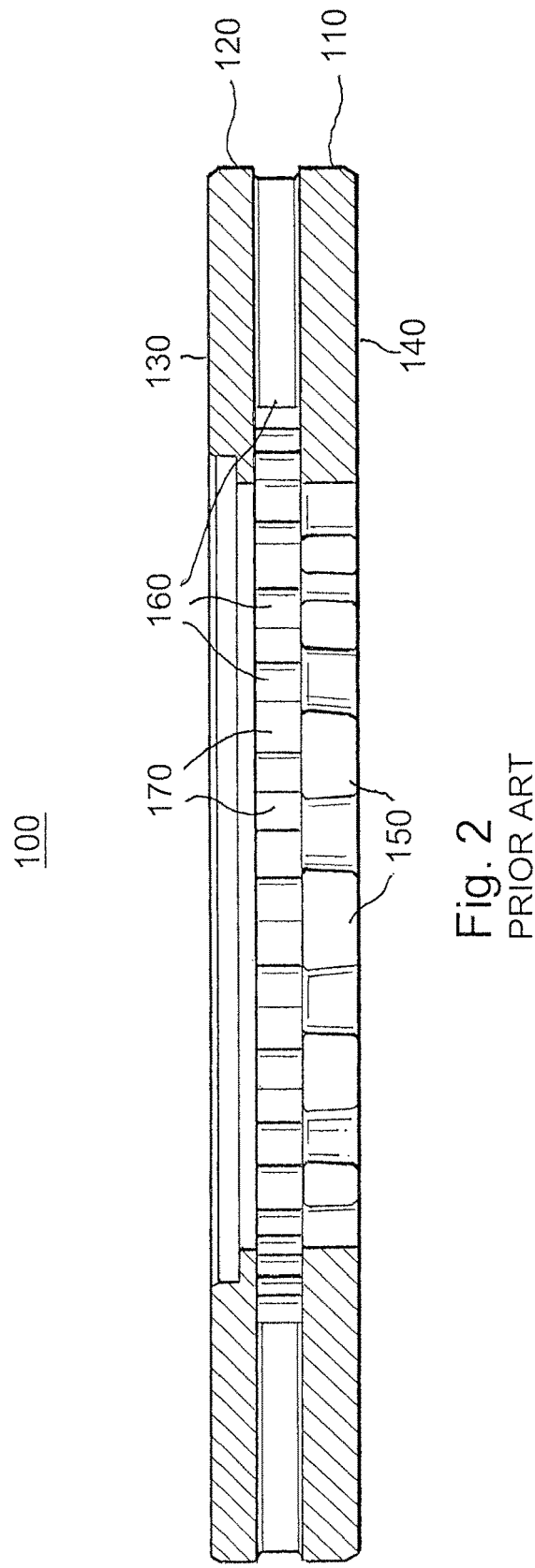
FIG. 2 is an elevation cross-section of a conventional brake disc.

FIG. 2 shows an elevation cross-section of a conventional brake disc 100 having a first disc plate portion 110 facing inboard when in an installed position on an axle hub (not illustrated for clarity), and a second disc plate portion 120 facing outboard toward a wheel mounted on the axle hub. The outboard second side plate includes a friction ring 130 that is generally open in the region radially inside the friction ring 130. The inboard first side plate includes a friction ring 140 and radially-inward projections 150 projecting inward from the inner radius of the friction ring 140 toward the axis of rotation of the axle hub. The radially-inward projections 150 are shaped to engage corresponding splines of the axle hub to locate the brake disc in a non-rotational manner on the axle hub so that braking forces generated by application of the disc brake's brake pads may be transferred to the axle hub to slow the vehicle. The first and second disc plates are held apart by cooling channel vanes 160 which form cooling channels 170 therebetween for passage of cooling air from the radially-inner region of the brake disc to the radially-outer region.

Figure 3:
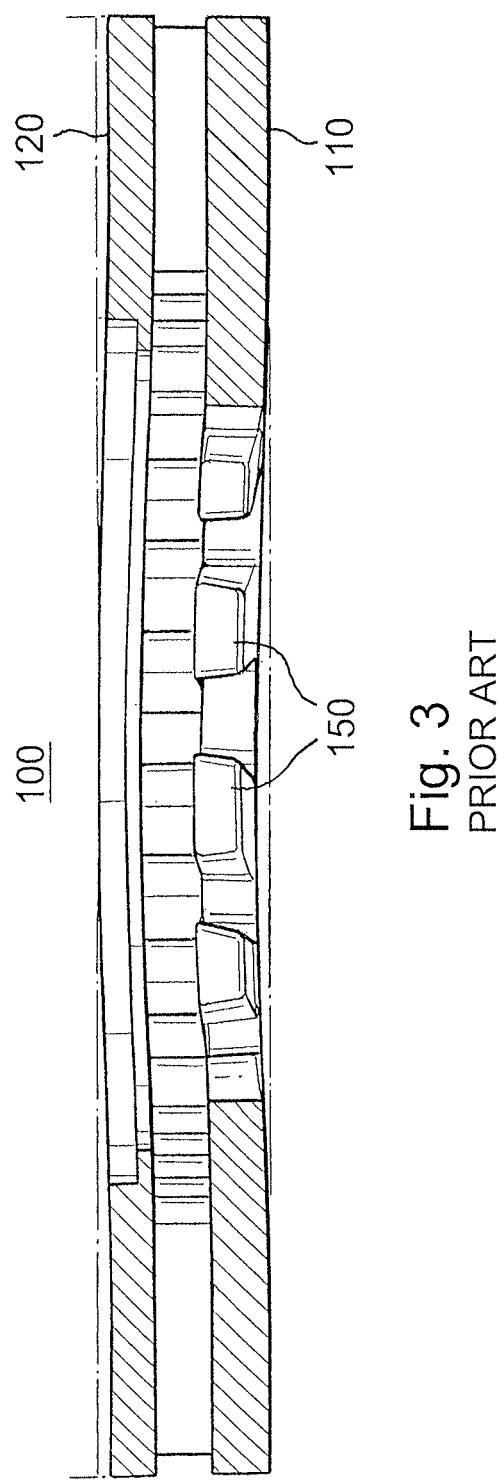
FIG. 3 is an elevation cross-section of a conventional brake disc illustrating temperature difference-caused coning deformation.

The FIG. 2 conventional brake disc has first and second disc plates 110, 120 which are equal in thickness, with conventional parallel-sided cooling channels 170. The material masses and geometries of the two sides of the disc 100 are essentially equal. When brake pads are applied to the two sides of this disc, approximately the same amount of heat energy is input into both sides of the disc. However, because the inboard first side plate 110 cannot dissipate heat as rapidly as the outboard second side, the temperature of the first side plate 110 rises to a higher level than the temperature of the second side plate 120, resulting in greater thermal expansion of the first side relative to the second side. This differential expansion tends to "bend" the brake disc into a slightly conical shape as the second side attempts to constrain the expansion of the first side via the cooling air vanes 160 between the disc plates 110, 120. FIG. 3 illustrates an example of such differential thermal expansion, where the radially-inward projections 150 which connect the brake disc 100 to the axle hub are axially displaced relative to the radial friction ring 140.

Figure 4:
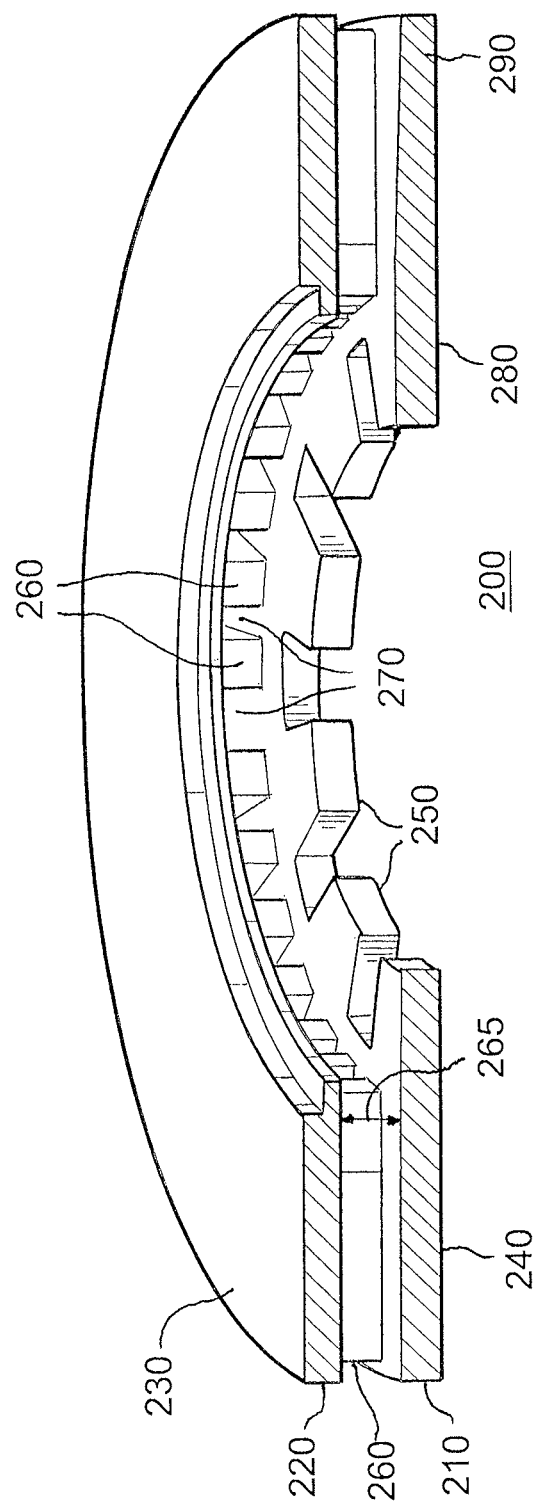
FIG. 4 is an oblique view of a sectioned brake disc in accordance with the present invention.

FIG. 4 is an oblique cross-section view of an embodiment of a brake disc in accordance with the present invention. In this embodiment the first and second disc plates 210, 220 include respective friction rings 240, 230, and the first disc plate 210 includes radially-inward projections 250 adjacent to the inner radius of its friction ring 240. In this embodiment the inboard side disc plate 210 has an axial thickness in its radially-outer region 290 which is approximately as thick as the corresponding region of outboard disc plate 220. The thickness of the disc plate 210 increases toward its radially-inner region 280 at the inward projections 250, i.e., toward the axle hub. This arrangement provides additional material mass on the inboard first side of the brake disc over which to distribute the heat energy being generated by application of the brake pads, thereby lowering the inboard side disc plate peak temperature as compared to a prior art constant-width disc plate. This distribution of mass also results in cooling channels 270 between the cooling vanes 260 having an expanding cross-sectional area from the inner radius of the friction rings 210, 220 to their outer radius, creating a "nozzle" which aids in increasing cooling air flow through the brake disc and associated transfer of heat energy away from the brake disc.

Figure 5:
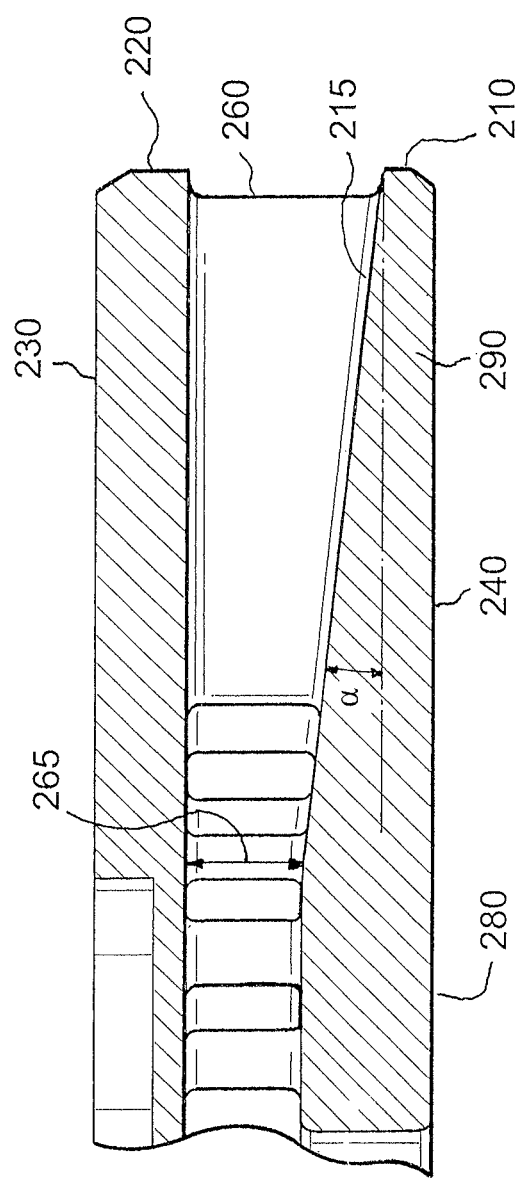
FIG. 5 is an enlarged view of a portion of the brake disc of FIG. 4.

FIG. 5 is an enlarged partial cross-section view of the right-hand side of the FIG. 4 brake disc embodiment, showing the disc material mass distribution and geometry in greater detail. In this figure the angle α of the taper of the inside surface 215 of the inboard first side disc plate 210, the thickness of the first side disc plate 210 from the radially-outer region 290 to the radially-inner region 280, and the distance 265 between the inner surfaces of the disc plates in the region of the inner radius of the outboard second side disc plate 220 may be determined by parametric study using known finite element thermal analysis programs. Among the objectives of such analyses is determination of the amount and distribution of disc plate mass (e.g., taper angle) and shape and width of the cooling channels (and thus, amount of cooling air flow) which results in the minimum amount of temperature difference between the first and second disc plates 210, 200 during the life of the brake disc, i.e., from its initial thickness to its end-of-service-life minimum thickness.

An example brake disc according to the present invention would be a disc having a constant outboard side disc plate thickness of about 14 mm when new may provide optimal anti-coning thermal performance over its life when paired with an inboard side disc plate which tapers at an draft angle of about 6.5° from a new outer radius thickness of 8 mm to a new inner radius of 18 mm, and a minimum cooling channel axial width of 17.5 mm at the inlet and 29.0 mm at the outlet, where the end of life thicknesses would be 3 mm to 14 mm, respectively. Preferably, the draft angle range is from 2 degrees to 10 degrees.

In one aspect of the invention, once a desired minimum end-of-service-life disc thickness is defined, thermal analysis may be performed to determine the extent to which temperature differences between the inboard first disc side 210 and outboard second disc side 220 may be minimized. Parameters that may be varied include the minimum thickness of the inboard side disc plate, the angle of the taper of the inboard side disc plate from the radially-outer region to the radially-inner region, minimum width of the cooling channels between the inboard side and outboard side disc plates, and the geometry of the surface of inboard side disc plate on its cooling channel-side. Alternatively, the optimization of differential mass distribution may be based on minimizing temperature differences at different times in the service life of the brake disc, such as at initial use or at a mid-point in disc wear.

In the embodiment shown in FIGS. 4-5, the taper of the cooling channel-side of the inboard disc plate is linear, however, a non-linear surface geometry, such as a convex or concave curve or a multiple-bend surface, may be used where such a distribution of material mass provides the desired reduction in temperature difference between the inboard side and outboard side disc plates. One of ordinary skill may determine the optimal inboard side disc plate and cooling channel geometry by optimizing calculations, for example, by employing thermal analysis calculation software available from Ansys Inc. of Canonsburg Pa.

FIGS. 6A-6D provide illustrations of the improved minimization of temperature differences between the inboard and outboard disc plates, comparing a prior art brake disc's thermal performance to that of a brake disc in accordance with the present invention. An axle hub 300 is illustrated adjacent to the brake discs.

Figure 6A:
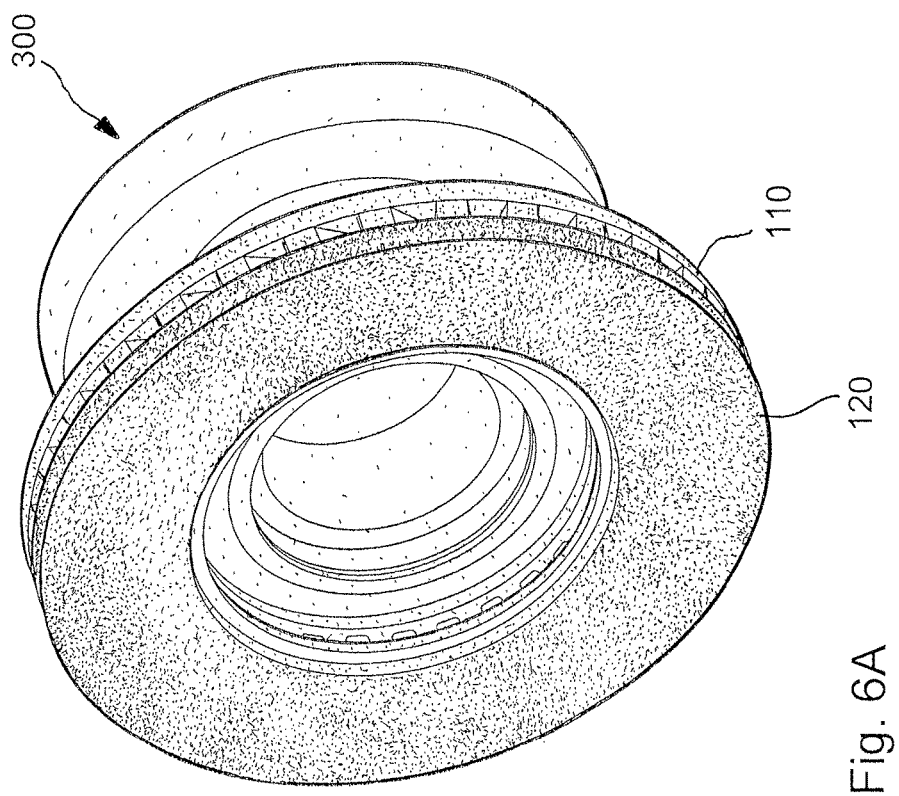
FIGS. 6A-6D are oblique and cross-section views of thermal analyses of a prior art brake disc and a brake disc in accordance with the present invention.
Figure 6B:
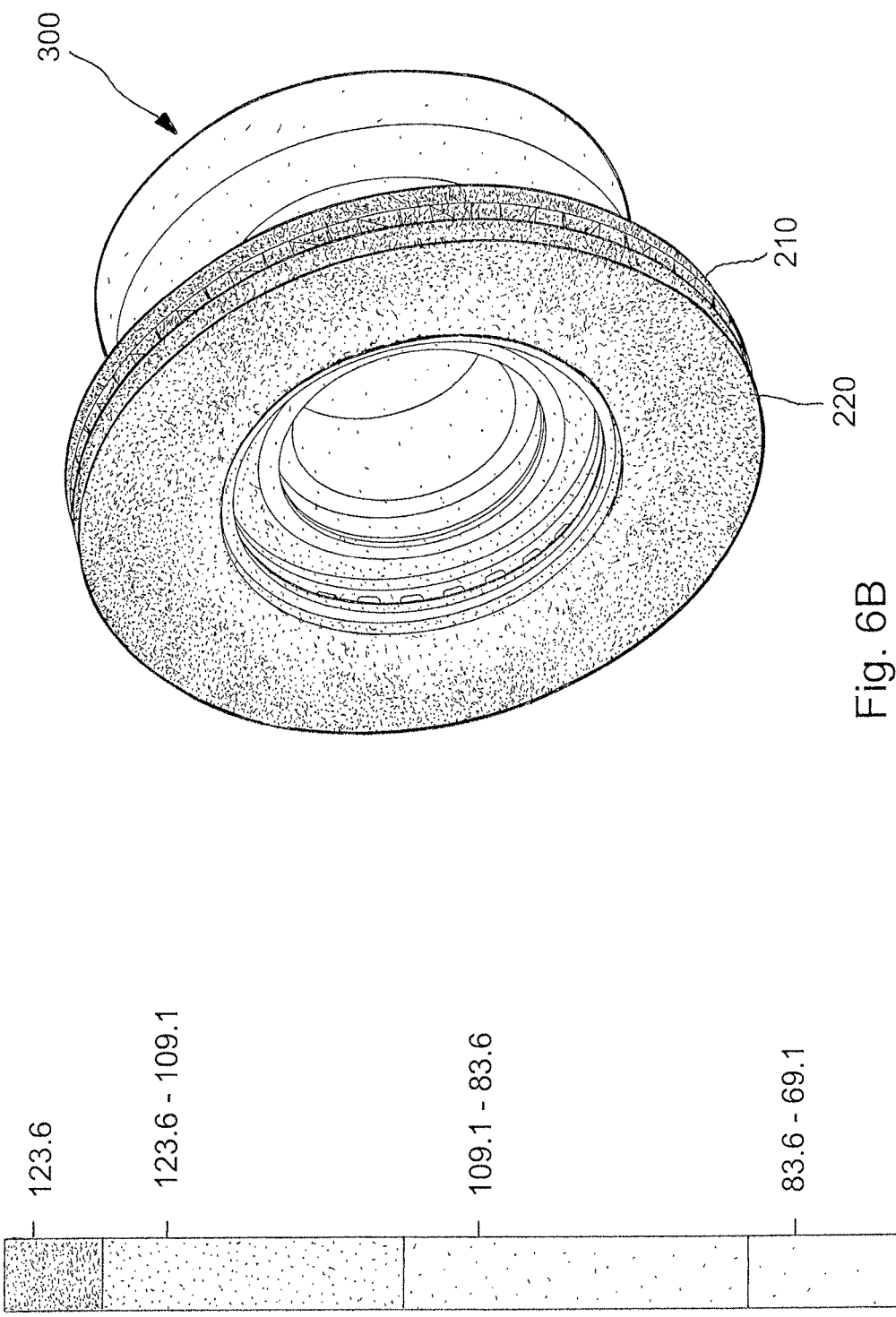
Figure 6C:
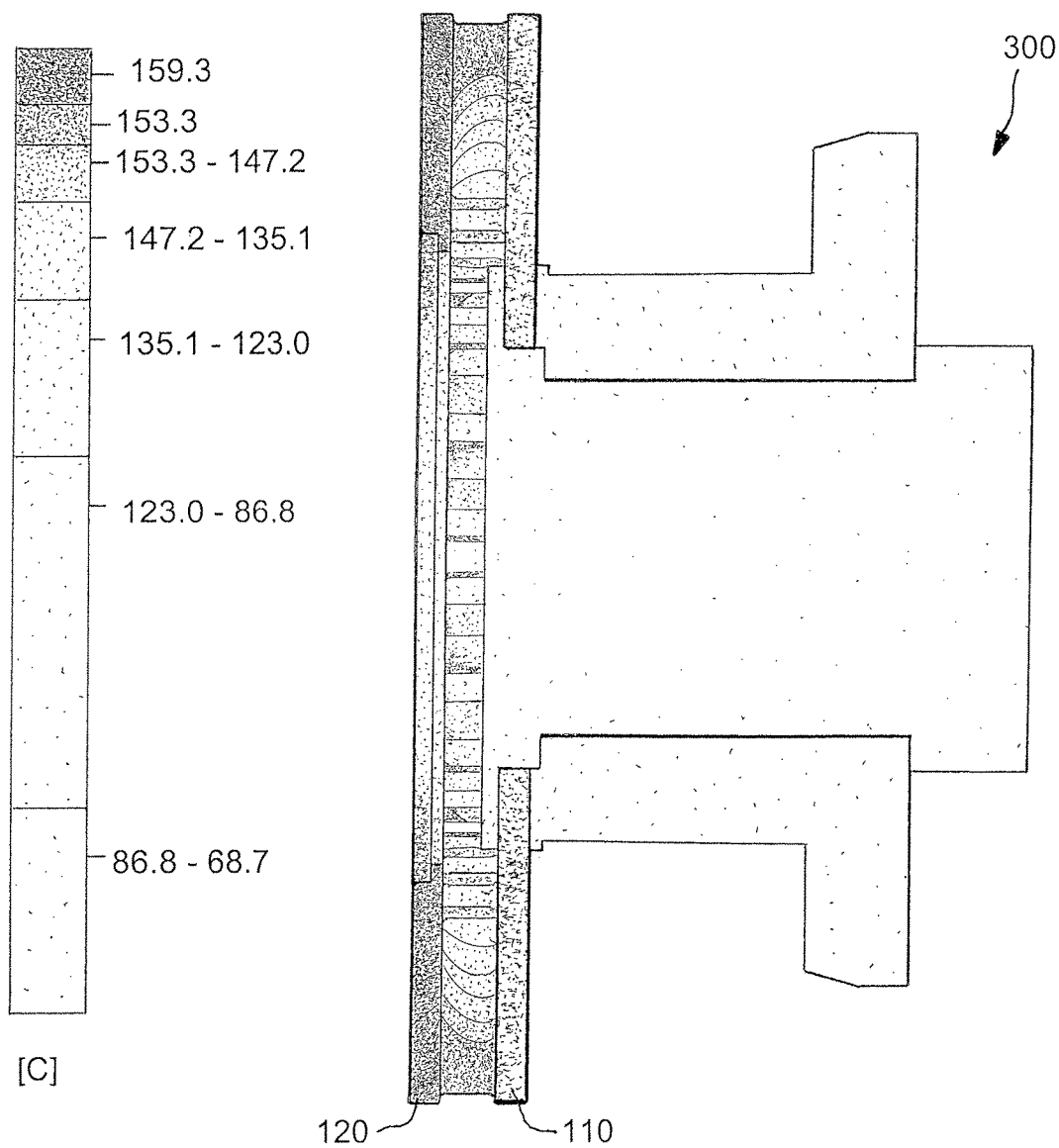
Figure 6D:
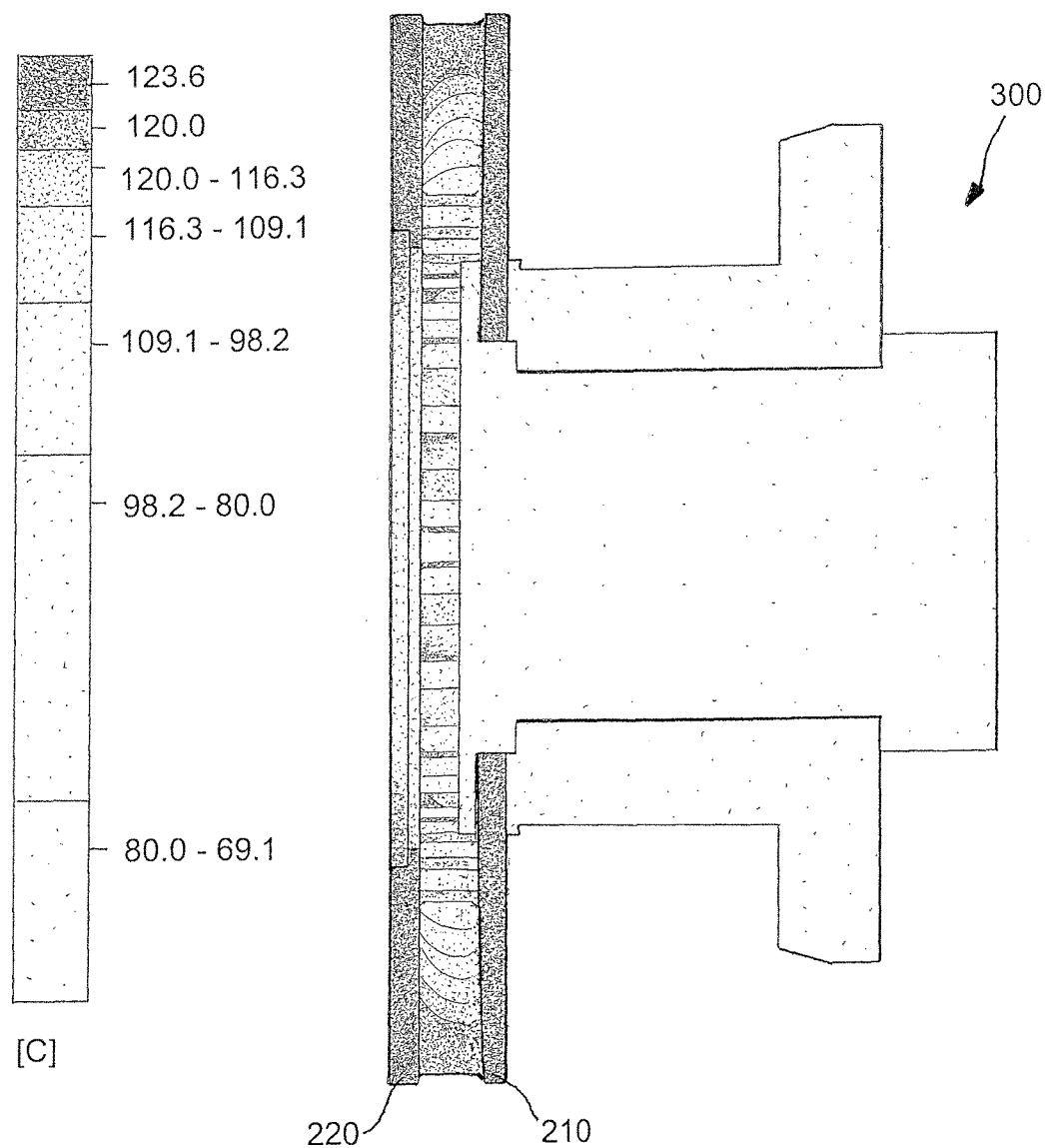

FIG. 6A illustrates the substantial difference in the temperatures present at the outer radii of the parallel, straight-sided disc plates 110, 120, where the plate 120 at its outer radius reaches a temperature of nearly 160° C., while the plate 110 is at approximately 145° C., a difference that can lead to brake disc coning. FIG. 6B, on the other hand, illustrates how the mass distribution approach of the present invention results in virtually equal outer radii temperatures in disc plates 210, 220, and importantly, much lower maximum temperatures (approximately 35° C. cooler) due to the enhanced heat dissipation afforded by the reconfigured disc plate shape. FIGS. 6C and 6D are elevation cross-section views of the FIGS. 6A and 6B brake discs, further illustrating the substantial thermal performance improvement provided by the present invention. In this example, the temperature difference between the first and second plates at the outer radius is less than 5° C., in particular here, less than 1° C., thereby effectively eliminating differential temperature-driven coning of the brake disc.

The foregoing disclosure has been set forth merely to illustrate the invention and is not intended to be limiting. For example, the foregoing embodiments discuss the present invention in the context of brake discs having their area of contact with the axle hub at the inboard side of the brake disc and the radially inner region of the outboard side being generally open, however the concept of the invention is equally applicable to other arrangements in which a difference in mass distribution and heat transfer is obtained between two brake disc plate portions, such as the brake disc/axle hub interface being located in the radially inner region of the outboard side or elsewhere (e.g., at the axial center of the brake disc or displaced axially inboard from the inboard disc plate portion). Since modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 brake disc
2 fixed axle portion
3 vehicle
4 axle hub
5 brake disc
9 wheel mounting studs
10 splines
12 fasteners
100 brake disc
110 first disc plate portion
120 second disc plate portion
130 second side friction ring
140 first side friction ring
150 radially-inward projections
160 cooling channel vanes
170 cooling channels 210 first disc plate
215 first side disc plate inside surface
220 second disc plate
230 second side friction ring
240 first side friction ring
250 radially-inward projections
260 cooling channel vanes
265 distance between disc plate inner surfaces
280 radially-inner region
290 radially-outer region

What is claimed is:

1. An internally ventilated brake disc, comprising:
at least two brake disc plates arranged perpendicular to an axis of rotation of the brake disc, the at least two brake disc plates including
 a first plate portion having a first friction ring and a radially inner region connected to the first friction ring, and
 a second plate portion having a second friction ring;
a plurality of cooling vanes forming cooling channels between adjacent vanes, the plurality of cooling vanes being located between the first and second disc plate portions and arranged to guide cooling air from the radially inner region to a radially outward region of the first friction ring; and
axle hub mounting features at the radially inner region of the first disc plate portion configured to cooperate with corresponding features of an axle hub when the brake disc is in an installed position on the axle hub,
wherein
 the first friction ring and the second friction ring have parallel outer surfaces and the second friction ring has parallel inner and outer surfaces, and
 an axial thickness of the first friction ring in a direction parallel to the brake disc rotation axis increases continuously from an outermost end of the radially outer region to an innermost end of a radially inner region of the first friction ring, and
 a sum of a mass of the radially inner region of the first disc plate portion and the mass of the first friction ring is greater than a mass of the second disc plate portion by an amount such that during a braking event in which the brake disc is installed on a vehicle a temperature difference between the second disc plate portion and the first disc plate portion is smaller than a temperature difference that would occur during the same braking event between friction rings having the same axial thickness as the second friction ring.

2. The internally ventilated brake disc of claim 1, wherein the second friction ring has the parallel inner and outer surfaces.

3. The internally ventilated brake disc of claim 2, wherein the axial thickness of the first friction ring at the radially outer region of the first friction ring is essentially the same as an axial thickness of the radially outer region of the second plate portion.

4. The internally ventilated brake disc of claim 1, wherein a taper angle of the axial thickness of the first friction ring from the radially outer region to the radially inner region is approximately 2° to 10°.

5. The internally ventilated brake disc of claim 1, wherein the axial thickness of the first friction ring increases at a rate that results in a temperature difference between the first and second plate portions during braking to below 5 C.

6. The internally ventilated brake disc of claim 5, wherein the temperature difference is below 1° C.

7. An internally ventilated brake disc, comprising:
at least two brake disc plates arranged perpendicular to an axis of rotation of the brake disc, the at least two brake disc plates including
 a first plate portion having a first friction ring and a radially inner region connected to the first friction ring, and
 a second plate portion having a second friction ring;
a plurality of cooling vanes forming cooling channels between adjacent vanes, the plurality of cooling vanes being located between the first and second disc plate portions and arranged to guide cooling air from the radially inner region to a radially outward region of the first friction ring; and
axle hub mounting features at the radially inner region of the first disc plate portion configured to cooperate with corresponding features of an axle hub when the brake disc is in an installed position on the axle hub,
wherein
 the first friction ring and the second friction ring have parallel outer surfaces and the second friction ring has parallel inner and outer surfaces,
 the first friction ring and the second friction ring have different masses, and
 an axial thickness of the first friction disc plate portion increases continuously from an outermost end of the radially outer region of the first friction ring to an innermost end of a radially inner portion of the first disc plate portion, and
 a sum of a mass of the radially inner region of the first disc plate portion and the mass of the first friction ring is greater than a mass of the second disc plate portion by an amount such that during a braking event in which the brake disc is installed on a vehicle a temperature difference between the second disc plate portion and the first disc plate portion is smaller than a temperature difference that would occur during the same braking event between friction rings having the same axial thickness as the second friction ring.

8. The internally ventilated brake disc of claim 7, wherein the mass of the first friction ring is larger than the mass of the second friction ring.

9. The internally ventilated brake disc of claim 7, wherein an axial width of the cooling channels increases from the radially inner region of the first friction ring to the radially outer region.

10. The internally ventilated brake disc of claim 7, wherein
the axial thickness of the first friction ring increases at a rate that results in a temperature difference between the first and second plate portions during braking to below 5° C.

11. The internally ventilated brake disc of claim 10, wherein
the temperature difference is below 1° C.

12. An internally ventilated brake disc, comprising:
at least two brake disc plates arranged perpendicular to an axis of rotation of the brake disc, the at least two brake disc plates including
 a first plate portion having a first friction ring and a radially inner region connected to the first friction ring, and
 a second plate portion having a second friction ring;
a plurality of cooling vanes forming cooling channels between adjacent vanes, the plurality of cooling vanes being located between the first and second disc plate portions and arranged to guide cooling air from the radially inner region to a radially outward region of the first friction ring; and axle hub mounting features at the radially inner region of the first disc plate portion configured to cooperate with corresponding features of an axle hub when the brake disc is in an installed position on the axle hub, wherein
the first friction ring and the second friction ring have parallel outer surfaces and the second friction ring has parallel inner and outer surfaces, an axial thickness of the first friction ring in a direction parallel to the brake disc rotation axis increases continuously from an outermost end of the radially outer region to an innermost end of a radially inner region of the first friction ring, an axial width of the cooling channels in the axial direction increases from radially inner cooling channel entrance ends to radially outer cooling channel exit ends, and, a sum of a mass of the radially inner region of the first disc plate portion and the mass of the first friction ring is greater than a mass of the second disc plate portion by an amount such that during a braking event in which the brake disc is installed on a vehicle a temperature difference between the second disc plate portion and the first disc plate portion is smaller than a temperature difference that would occur during the same braking event between friction rings having the same axial thickness as the second friction ring.

13. The internally ventilated brake disc of claim 12, wherein
the axial width of the cooling channels increases in a linear manner between the entrance ends and the exit ends.

14. The internally ventilated brake disc of claim 12, wherein
the axial width of the cooling channel entrance ends and a taper angle of the axial thickness of the first friction ring from the radially outer region to the radially inner region are selected such that convective heat transfer from the first friction ring to air accelerated by nozzle effect through the cooling channels results in maximum temperatures of the first friction ring and the second friction ring being approximately equal.

15. The internally ventilated brake disc of claim 12, wherein
the second friction ring has the parallel inner and outer surfaces.

16. The internally ventilated brake disc of claim 15, wherein
the axial thickness of the first friction ring at the radially inner region of the first friction ring corresponds to an axial thickness of the radially inner region of the second plate portion.

17. The internally ventilated brake disc of claim 16, wherein
a taper angle of the axial thickness of the first friction ring from the radially outer region to the radially inner region is approximately 2° to 10°.

\* \* \* \* \*